United States Patent Office 3,226,381
Patented Dec. 28, 1965

3,226,381
POLY (α-DIAZOALKANOATES)
David S. Breslow and Harold M. Spurlin, Wilmington,
Del., assignors to Hercules Powder Company, Wilmington, Del., a corporation of Delaware
No Drawing. Filed July 6, 1964, Ser. No. 380,687
15 Claims. (Cl. 260—239)

This application is a continuation-in-part of application Serial No. 198,465, filed May 29, 1962, now abandoned, which is in turn a division of application Serial No. 88,314, filed February 10, 1961, now abandoned, and is also a continuation-in-part of application Serial No. 288,896, filed June 19, 1963, which is in turn a continuation-in-part of application Serial No. 88,314, and of application Serial No. 88,314.

This invention relates to new poly(diazo) compounds and more particularly to poly(α-diazoalkanoate) esters of polyhydric alcohols.

The new poly(diazoalkanoate) esters of this invention are particularly useful as cross-linking agents and are generally organo-soluble liquids or solids.

These new compounds have the general formula

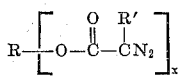

where R is a polyvalent organic radical, R' is a hydrogen, alkyl, aryl, or —COOZ radical where Z is alkyl or aryl, and $x$ is an integer greater than 1 and equal to the valence of R. Exemplary of these poly(α-diazoalkanoate) esters of polyhydric alcohols are the poly(diazoacetate) esters of 1,6-hexanediol, 1,8-octanediol, 1,10-decanediol, 1,11-undecanediol, 1,5-tetradecanediol, 1,9-hexadecanediol, 1,10-octadecanediol, diethylene glycol, triethylene glycol, neopentyl glycol, thiodiglycol (i.e., dioxyethylene sulfide), trimethylolmethane, trimethylolethane, glycerol, pentaerythritol, p-hydroxymethylbenzyl alcohol, hydroquinone, cyclohexane-1,4-diol, etc., and corresponding poly(α-diazopropionate), poly(α-diazobutyrate), poly(α-diazo-α-phenylacetate), poly(α-diazo-α-carboalkoxyacetate), poly-(α-diazo-α-carbophenoxyacetate), etc., esters. Specific examples of such esters are the bis(diazoacetate) ester of 1,6-hexanediol, the bis(diazoacetate) ester of 1,10-decanediol, the tris(diazoacetate) ester of trimethylolethane, the tetra(diazoacetate) ester of pentaerythritol, the bis(diazoacetate) ester of diethylene glycol, the bis-(diazoacetate) ester of dioxyethylene sulfide, the bis-(diazoacetate) ester of p-hydroxymethylbenzyl alcohol, the tris(α-diazopropionate) ester of trimethylolmethane, the bis(α-diazopropionate) ester of 1,10-decanediol, the bis(α-diazobutyrate) ester of 1,6-hexanediol, the bis(α-diazo-α-phenylacetate) ester of 1,10-decanediol, the bis-(α-diazo-α-phenylacetate) ester of hydroquinone, the bis-(α-diazo-α-carbomethoxyacetate) ester of 1,4-butanediol, the bis(α-diazo-α-carbophenoxyacetate) ester of 1,6-hexanediol, etc.

The new poly(α-diazoalkanoate) esters of polyhydric alcohols can be prepared in various ways, as, for example, by reacting an aminoacyl chloride such as glycinyl chloride hydrochloride with an organic dihydroxy compound as follows:

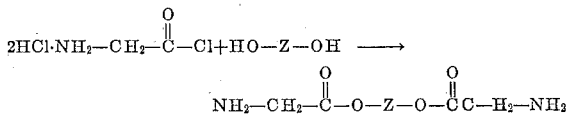

where Z is the same as defined above. The resulting diamine is converted to the respective bis(diazoalkanoate) by reaction with dilute aqueous sulfuric acid and sodium nitrite beneath a layer of ether.

The following examples are presented for purposes of illustrating the preparation and utility of these new compounds as cross-linking agents, parts and percentages being by weight unless otherwise specified.

The extent of cross-linking is determined by analysis for percent gain in insolubility in solvents in which the uncross-linked polymer was soluble, hereinafter termed "percent gel." Percent gel is determined as follows: A weighed sample of polymer is soaked in hot toluene for a specified length of time. The sample is then removed and dried to constant weight. The weights of initial and final sample are corrected for polymer and copolymer content based on knowledge of components. From these figures $$\frac{\text{corrected dry weight}}{\text{corrected initial weight}} \times 100 = \text{percent gel}$$

Example 1

The bis(diazoacetate) esters of 1,6-hexanediol and 1,10-decanediol were prepared by reacting glycinyl chloride hydrochloride with 1,6-hexanediol and 1,10-decanediol respectively. The intermediate diamines were each treated with aqueous sodium nitrite and 10% sulfuric acid in an ice bath and while under a layer of ether. The ether layer was separated, washed with 5% aqueous sodium carbonate solution, dried with sodium sulfate, and then the ether removed under vacuum.

The bis(diazoacetate) ester of 1,6-hexanediol produced was a pale yellow oil having a half-life of 16 minutes at a temperature of 155° C. It was analyzed for percent carbon, hydrogen, and nitrogen. The results of the analysis are given below.

| | Found | Calculated |
|---|---|---|
| C, percent | 46.8 | 47.2 |
| H, percent | 5.6 | 5.55 |
| N, percent | 21.6 | 22 |

The bis(diazoacetate) ester of 1,10-decanediol produced was a yellow oil. It was analyzed for percent carbon, hydrogen, and nitrogen. The results of the analysis are given below.

| | Found | Calculated |
|---|---|---|
| C, percent | 54.3 | 54.2 |
| H, percent | 7.0 | 7.15 |
| N, percent | 18.1 | 18.0 |

Examples 2–8

The two bis(diazoacetates) described in Example 1 were tested as cross-linking agents for various hydrocarbon polymers by mixing one or the other with a solution of a polymer in a solvent, removing the solvent by evaporation, and then curing the polymer by heating in an iron mold for a given length of time at a given temperature. The polymers cross-linked, the solvents in which they were dissolved, the bis(diazoacetate) used, the parts of cross-linking agent per 100 parts of polymer, the temperature and time of curing, and the amount of cross-linking (recorded as percent gel) are listed in Table 1.

acting glycinyl chloride hydrochloride with diethylene glycol and thiodiglycol, respectively, and diazotizing the

TABLE 1

| Example No. | Polymer | Cross-linking Agent | Solvent | Parts of Cross-linking Agent/100 Parts of Polymer | Temp. (° C.) | Time (min.) | Percent Gel |
|---|---|---|---|---|---|---|---|
| 2 | Natural rubber | Bis(diazoacetate) ester of 1,6-hexanediol. | Trichloroethylene | 3 | 180 | 20 | 90 |
| 3 | ___do___ | ___do___ | ___do___ | 5 | 180 | 25 | 96 |
| 4 | Ethylene-propylene copolymer containing 32 mole percent propylene. | ___do___ | ___do___ | 5.8 | 175–185 | 20 | 60 |
| 5 | ___do___ | Bis(diazoacetate) ester of 1,10-decanediol. | ___do___ | 4.5 | 175–180 | 30 | 66 |
| 6 | ___do___ | ___do___ | ___do___ | 12 | 185 | 30 | 76 |
| 7 | Natural rubber | ___do___ | ___do___ | 5 | 180 | 25 | 95 |
| 8 | Styrene-butadiene rubber containing 25 mole percent styrene. | ___do___ | Chlorobenzene | 5.9 | 175–180 | 20 | 89 |

Example 9

Natural rubber (smoked sheet #1) was compounded with carbon black, stearic acid, zinc oxide, and the bis-(diazoacetate) ester of 1,10-decanediol on a 2-roll mill at 80° C. for 10 minutes and then heated at 175° C. for 30 minutes under a pressure of 1000 p.s.i. The composition used is tabulated below:

Composition: Parts
  Natural rubber _____ 100
  High abrasion furnace black _____ 50
  Stearic acid _____ 1
  Zinc oxide _____ 5
  Bis(diazoacetate) ester of 1,10-decanediol ___ 5

The resulting vulcanizate was a strong, tough rubber.

Example 10

To 100 parts of styrene-butadiene copolymer (GRS 1500) were added 50 parts of high abrasion furnace black, 1 part stearic acid, 5 parts of zinc oxide, and 5 parts of the bis(diazoacetate) ester of 1,10-decanediol. This mixture was blended on a 2-roll mill at 80° C. for 10 minutes and then cured between steel plates at a temperature of 175° C. and a pressure of 1000 p.s.i. for 30 minutes. The resulting vulcanizate was a strong, tough rubber.

Example 11

To a slurry of high-density polyethylene in benzene was added sufficient solution of the bis(diazoacetate) ester of 1,6-hexanediol dissolved in benzene to make a slurry containing 3 parts of diazo compound per 100 parts of polymer. The slurry was dried overnight at room temperature and the resulting powder pressed between steel plates at a temperature of 175° C. and a pressure of 1000 p.s.i. for 30 minutes. The film thus formed was substantially insoluble in hot decahydronaphthalene. The same procedure was carried out with polypropylene with the same results.

Example 12

The tris(diazoacetate) ester of trimethylolethane was prepared from trimethylolethane by the method described in Example 1. The resulting tris(diazo) compound was a yellow viscous oil.

Natural rubber was compounded with 5 parts per hundred of the above-described tris(diazo) compound on a 2-roll mill at 80° C. for 12 minutes. The composition was cured at a temperature of 180° C. for 25 minutes under a pressure of 1000 p.s.i. The resulting vulcanizate had a percent gel of 93.

Examples 13–14

The bis(diazoacetate) esters of diethylene glycol and thiodiglycol(dioxyethylene sulfide) were prepared by reacting glycinyl chloride hydrochloride with diethylene glycol and thiodiglycol, respectively, and diazotizing the amino groups following the procedure described in Example 1. Both esters were obtained as viscous, yellow oils. Analysis for nitrogen showed the bis(diazoacetate) ester of diethylene glycol to contain 22.8% N (theory 23.1%) and the bis(diazoacetate) ester of thiodiglycol to contain 21.9% N (theory 21.7%).

Examples 15 and 16

The bis($\alpha$-diazopropionate) esters of 1,6-hexanediol and 1,8-octanediol were prepared by the following procedure using 16.7 g. of the hydrochloride of the DL-alanine ester of 1,6-hexanediol and 18.1 g. of the corresponding ester of 1,8-octanediol. To a solution of each in 50 ml. of water was added 80 ml. of methylene chloride. After cooling to −5° C., a solution of 8.3 g. of sodium nitrite in 25 ml. of water was added with stirring. This was followed by the addition of 10 ml. of 5% sulfuric acid, which was added slowly at −5° C. to 0° C. The mixture was stirred for 10 minutes and then was poured into a cold solution of sodium bicarbonate. The organic layer was separated, washed once with water and dried over anhydrous calcium sulfate. Evaporation of the solvent left a viscous, yellow oil in each case.

To a slurry of crystalline polypropylene in benzene was added sufficient of the above-prepared bis($\alpha$-diazopropionate) ester of 1,6-hexanediol dissolved in benzene to make a slurry containing 5 parts of diazo compound per 100 parts of polymer. The slurry was dried overnight at room temperature and the resulting powder pressed between steel plates at a temperature of 175° C. and a pressure of 800 p.s.i. for 30 minutes. The film thus formed was substantially insoluble in hot decahydronaphthalene.

Example 17

The half ethyl ester-acid chloride of diazomalonic acid was prepared according to Staudinger, Becker and Hirzel, Ber. 49, 1982 (1916). To a solution of 11.8 g. of hexamethylene glycol and 16 g. of pyridine in 100 ml. of ether was added 35.4 g. of the diazomalonate slowly with stirring. The reaction was stirred at room temperature for 24 hours, filtered, the solid washed with ether, and the combined ether layers evaporated. The bis($\alpha$-diazo-$\alpha$-carboethoxyacetate) ester of hexanediol was obtained as a viscous, pale yellow oil.

Example 18

The bis($\alpha$-diazo-$\alpha$-phenylacetate) of triethylene glycol was prepared by esterifying $\alpha$-amino-phenylacetic acid with triethylene glycol and diazotizing the amino groups by the procedure described in Example 1. The ester so obtained was a yellow oil which on analysis was found to contain 12.4% N (theory 12.8%).

What we claim and desire to protect by Letters Patent is:

1. A poly(α-diazoalkanoate) ester of a polyhydric alcohol selected from the group consisting of alkanepolyols containing 3 to 18 carbon atoms and 2 to 4 hydroxyl groups, diethylene glycol, triethylene glycol, thiodiglycol, cyclohexylene diols, phenylene diols and phenylene dimethylene diols, said α-diazoalkanoate group having the formula

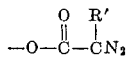

where R' is selected from the group consisting of hydrogen, alkyl radicals containing 1 to 2 carbon atoms, phenyl, and —COOZ where Z is an alkyl group containing 1 to 2 carbon atoms or phenyl.

2. A poly(α-diazoalkanoate) ester of an alkane polyol containing 5 to 18 carbon atoms and 2 to 4 hydroxyl groups.

3. A bis(diazoacetate) ester of an alkanediol containing 5 to 18 carbon atoms.

4. The bis(diazoacetate) ester of 1,6-hexanediol.

5. The bis(diazoacetate) ester of 1,10-decanediol.

6. The bis(diazoacetate) ester of thiodiglycol.

7. The bis(diazoacetate) ester of diethylene glycol.

8. A bis(α-diazopropionate) ester of an alkanediol containing 5 to 18 carbon atoms.

9. The bis(α-diazopropionate) ester of 1,6-hexanediol.

10. The bis(α-diazopropionate) ester of 1,8-octanediol.

11. The tris(diazoacetate) ester of trimethylolethane.

12. A bis(α-diazo-α-phenylacetate) ester of an alkanediol containing 5 to 18 carbon atoms.

13. The bis(α-diazo-α-phenylacetate) ester of triethylene glycol.

14. A bis(α-diazo-α-carbalkoxyacetate) ester of an alkanediol containing 5 to 18 carbon atoms and said alkoxy group containing 1 to 2 carbon atoms.

15. The bis(α-diazo-α-carbethoxyacetate) ester of 1,6-hexanediol.

No references cited.

NICHOLAS S. RIZZO, *Primary Examiner*.